United States Patent
Tenny

(10) Patent No.: US 10,440,500 B2
(45) Date of Patent: Oct. 8, 2019

(54) SYSTEM AND METHOD FOR CONFIGURING AND MANAGING ON-DEMAND POSITIONING REFERENCE SIGNALS

(71) Applicant: FutureWei Technologies, Inc., Plano, TX (US)

(72) Inventor: Nathan Edward Tenny, Portland, OR (US)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 0 days.

(21) Appl. No.: 16/031,122

(22) Filed: Jul. 10, 2018

(65) Prior Publication Data

US 2019/0166452 A1 May 30, 2019

Related U.S. Application Data

(60) Provisional application No. 62/592,753, filed on Nov. 30, 2017.

(51) Int. Cl.
*H04W 4/00* (2018.01)
*H04W 4/02* (2018.01)
*G01S 5/14* (2006.01)

(52) U.S. Cl.
CPC .............. *H04W 4/02* (2013.01); *G01S 5/14* (2013.01)

(58) Field of Classification Search
CPC ................................. H04W 4/02; G01S 5/14
See application file for complete search history.

(56) References Cited

U.S. PATENT DOCUMENTS

| | | | |
|---|---|---|---|
| 2003/0054835 A1* | 3/2003 | Gutowski | G01S 5/02 455/456.1 |
| 2011/0305180 A1* | 12/2011 | Osterling | H04W 74/006 370/311 |
| 2013/0044716 A1 | 2/2013 | Wang | |
| 2013/0190006 A1* | 7/2013 | Kazmi | H04W 64/006 455/456.1 |
| 2013/0203447 A1 | 8/2013 | Hannan et al. | |
| 2014/0050112 A1* | 2/2014 | Muniz Garcia | G01S 5/0205 370/252 |
| 2014/0073356 A1 | 3/2014 | Siomina et al. | |

(Continued)

FOREIGN PATENT DOCUMENTS

| | | |
|---|---|---|
| CN | 103338513 A | 10/2013 |
| WO | 2011134153 A1 | 11/2011 |
| WO | WO2018112735 A1 * | 6/2018 |

OTHER PUBLICATIONS

"3rd Generation Partnership Project; Technical Specification Group Radio Access Network; Evolved Universal Terrestrial Radio Access (E-UTRA); LTE Positioning Protocol A (LPPa), (Release 14)," 3GPP TS 36.455, V14.3.0, Sep. 2017, 74 pages.

(Continued)

*Primary Examiner* — Khai M Nguyen
(74) *Attorney, Agent, or Firm* — Slater Matsil, LLP

(57) ABSTRACT

A method for operating a device includes selecting a set of access nodes in accordance with a first estimated position of a user equipment (UE), sending, to the set of access nodes, a first message to activate positioning signal transmission, sending, to the UE, a request for position measurement information, and receiving, from the UE, the position measurement information.

25 Claims, 8 Drawing Sheets

(56) References Cited

U.S. PATENT DOCUMENTS

| | | | |
|---|---|---|---|
| 2015/0296359 A1 | 10/2015 | Edge | |
| 2016/0205499 A1* | 7/2016 | Davydov | H04W 4/02 |
| | | | 455/456.1 |
| 2016/0227365 A1* | 8/2016 | Siomina | G01S 5/0205 |
| 2018/0299528 A1* | 10/2018 | Cui | H04W 64/00 |
| 2019/0014510 A1* | 1/2019 | Rune | H04W 36/0055 |

OTHER PUBLICATIONS

Ericsson, "Preliminary Radio Interface Concepts for mmwave Mobile Communications," Version 10, Document No. H2020-ICT-671650-mmMAGIC/D4.1, Jan. 7, 2015, 232 pages.

Ericsson, "Final mmMAGIC System Concept," Version 145, Document No. H2020-ICT-671650-mmMAGIC/D6.6, Dec. 7, 2017, 110 pages.

Fischer, Sven, "Observed Time Difference of Arrival (OTDOA) Positioning in 3GPP LTE," Qualcomm Technologies, Inc., Jun. 6, 2014, 62 pages.

"3rd Generation Partnership Project; Technical Specification Group Services and System Aspects; System Architecture for the 5G System; Stage 2, (Release 15)," 3GPP TS 23.501, V152.0, Jun. 2018, 217 pages.

"3rd Generation Partnership Project; Technical Specification Group Radio Access Network; Evolved Unviersal STerrestrial Radio Access Network; (E-UTRAN); Stage 2 functional specification of User Equipment (UE) positioning in E-UTRAN, (Release 14)," 3GPP TS 36305, V14.1.0, Mar. 2017, 78 pages.

\* cited by examiner

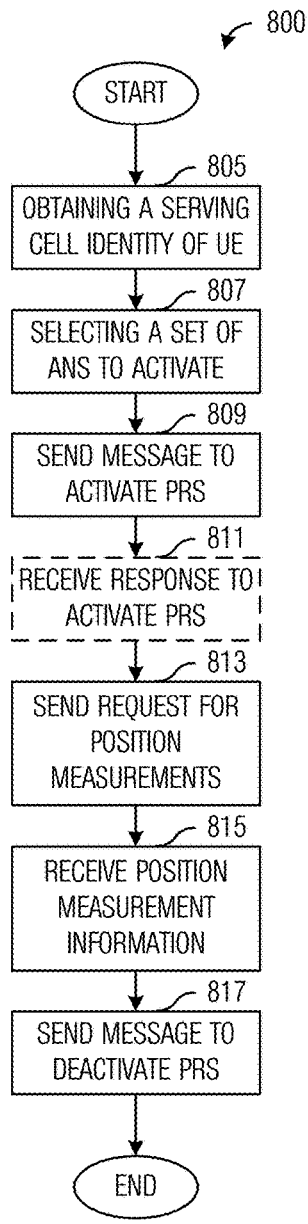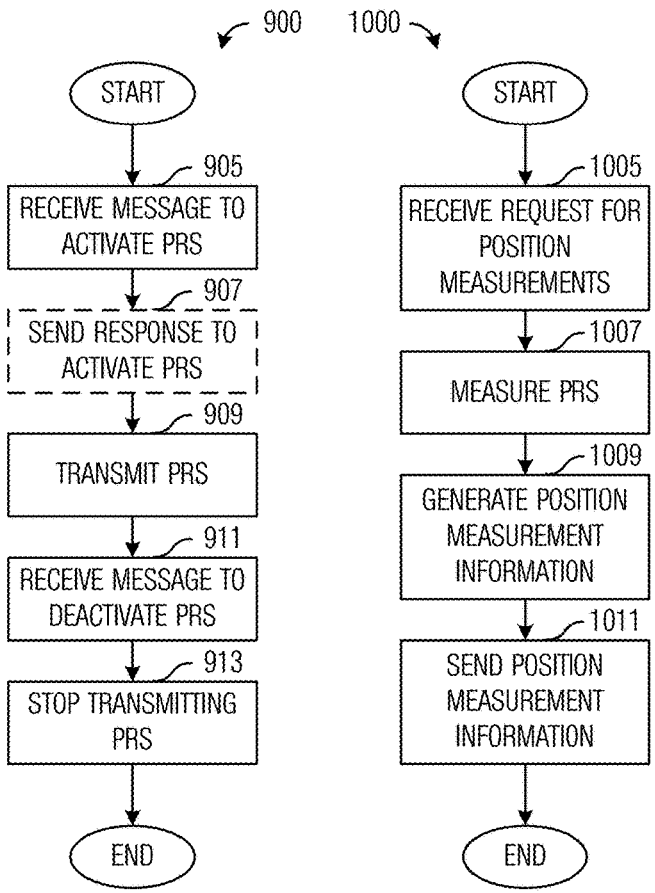
Fig. 8
Fig. 9
Fig. 10

SYSTEM AND METHOD FOR CONFIGURING AND MANAGING ON-DEMAND POSITIONING REFERENCE SIGNALS

This application claims the benefit of U.S. Provisional Application No. 62/592,753, filed on Nov. 30, 2017, entitled "System and Method for Configuring and Managing On-Demand Positioning Reference Signals," which application is hereby incorporated herein by reference in its entirety.

TECHNICAL FIELD

The present disclosure relates generally to a system and method for digital communications, and, in particular embodiments, to a system and method for configuring and managing on-demand position reference signals.

BACKGROUND

The physical position of a device is an important piece of information. The physical position of the device may be useful for emergency services, as well as for improving the user experience. As an example, the ability to determine the physical position of the device may assist emergency services in locating the user of the device when the user is unable to respond to emergency responders. As another example, the physical position of the device may allow a service provider to provide suggestions for products, services, applications, advertisements, and so on, that may be useful to the user of the device.

Observed time difference of arrival (OTDOA) is a technique for determining the position of a device by measuring time differences between specific signals transmitted by other devices. OTDOA was introduced in the Third Generation Partnership Project (3GPP) Long Term Evolution (LTE) series of technical standards. In OTDOA, positioning reference signals (PRSs) are transmitted by base stations, such as evolved NodeBs (eNBs) in 3GPP LTE, to allow user equipments (UEs) to measure time differences between PRSs transmitted by different base stations. However, in 3GPP LTE, the PRSs are transmitted by the eNBs periodically with periodicity and duration that are configured during the system planning and network management stages of the communications system. Therefore, the PRSs are transmitted even when UEs are not using the PRSs to determine their position, which is a waste of communications system resources.

SUMMARY

Example embodiments provide a system and method for configuring and managing on-demand position reference signals.

In accordance with an example embodiment, a computer-implemented method for operating a device is provided. The method includes selecting, by the device, a set of access nodes in accordance with a first estimated position of a user equipment (UE), sending, by the device to the set of access nodes, a first message to activate positioning signal transmission, sending, by the device to the UE, a request for position measurement information, and receiving, by the device from the UE, the position measurement information.

Optionally, in any of the preceding embodiments, an embodiment wherein the first estimated position of the UE comprises a serving cell identifier of the UE.

Optionally, in any of the preceding embodiments, an embodiment wherein selecting the set of access nodes comprises selecting, by the device, an access node corresponding to the serving cell identifier as a member of the set of access nodes.

Optionally, in any of the preceding embodiments, an embodiment wherein selecting the set of access nodes further comprises selecting, by the device, one or more access nodes that are neighbors of the access node corresponding to the serving cell identifier as members of the set of access nodes.

Optionally, in any of the preceding embodiments, an embodiment wherein the position measurement information comprises observed time difference of arrival (OTDOA) measurements.

Optionally, in any of the preceding embodiments, an embodiment further includes determining, by the device, a second estimated position of the UE in accordance with the OTDOA measurements, and sending, by the device to a client, the second estimated position of the UE.

Optionally, in any of the preceding embodiments, an embodiment wherein the position measurement information comprises a third estimated position of the UE, and wherein the method comprises sending, by the device to a client, the third estimated position of the UE.

Optionally, in any of the preceding embodiments, an embodiment further includes sending, by the device to a subset of the set of access nodes, a second message to deactivate positioning signal transmission.

Optionally, in any of the preceding embodiments, an embodiment wherein the subset of the set of access nodes comprises access nodes not selected for transmitting positioning signals for any other UE.

Optionally, in any of the preceding embodiments, an embodiment further includes receiving, by the device from at least one access node of the set of access nodes, at least one response responsive to the first message to activate positioning signal transmission.

Optionally, in any of the preceding embodiments, an embodiment wherein the at least one response comprises a positioning signal configuration of the at least one access node.

Optionally, in any of the preceding embodiments, an embodiment further includes generating, by the access node, assistance data in accordance with the positioning signal configuration of the at least one access node, and sending, by the device to the UE, the assistance data.

Optionally, in any of the preceding embodiments, an embodiment wherein the device comprises a Location Management Function (LMF).

In accordance with an example embodiment, a computer-implemented method for operating an access node is provided. The method includes receiving, by the access node from a device, a first message to activate positioning signal transmission, transmitting, by the access node, a positioning signal in accordance with the first message, receiving, by the access node from the device, a second message to deactivate positioning signal transmission, and stopping, by the access node, the transmission of the positioning signal.

Optionally, in any of the preceding embodiments, an embodiment further includes sending, by the access node to the device, a response responsive to the first message to activate positioning signal transmission.

Optionally, in any of the preceding embodiments, an embodiment wherein the response comprises a positioning signal configuration of the access node.

In accordance with an example embodiment, a device is provided. The device includes a non-transitory memory storage comprising instructions, and one or more processors in communication with the memory storage. The one or more processors execute the instructions to select a set of access nodes in accordance with a first estimated position of a UE, send, to the set of access nodes, a first message to activate positioning signal transmission, send, to the UE, a request for position measurement information, and receive, from the UE, the position measurement information.

Optionally, in any of the preceding embodiments, an embodiment wherein the one or more processors further execute the instructions to select an access node corresponding to a serving cell identifier of the UE as a member of the set of access nodes.

Optionally, in any of the preceding embodiments, an embodiment wherein the position measurement information comprises OTDOA measurements, and wherein the one or more processors further execute the instructions to determine a second estimated position of the UE in accordance with the OTDOA measurements, and send, to a client, the second estimated position of the UE.

Optionally, in any of the preceding embodiments, an embodiment wherein the one or more processors further execute the instructions to send, to a subset of the set of access nodes, a second message to deactivate positioning signal transmission.

Optionally, in any of the preceding embodiments, an embodiment wherein the one or more processors further execute the instructions to receive, from at least one access node of the set of access nodes, at least one response responsive to the first message to activate positioning signal transmission.

Optionally, in any of the preceding embodiments, an embodiment wherein the at least one response comprises a positioning signal configuration of the at least one access node, and wherein the one or more processors further execute the instructions to generate assistance data in accordance with the positioning signal configuration of the at least one access node, and send, to the UE, the assistance data.

In accordance with an example embodiment, an access node is provided. The access node includes a non-transitory memory storage comprising instructions, and one or more processors in communication with the memory storage. The one or more processors execute the instructions to receive, from a device, a first message to activate positioning signal transmission, transmit a positioning signal in accordance with the first message, receive, from the device, a second message to deactivate positioning signal transmission, and stop the transmission of the positioning signal.

Optionally, in any of the preceding embodiments, an embodiment wherein the one or more processors further execute the instructions to send, to the device, a response responsive to the first message to activate positioning signal transmission.

Optionally, in any of the preceding embodiments, an embodiment wherein the response comprises a positioning signal configuration of the access node.

Practice of the foregoing embodiments enables the configuration and management of reference signals used for positioning purposes based on need. The on-demand transmission of these reference signals helps to reduce communications system overhead by freeing up communications system resources allocated for the transmission of the unused reference signals to be utilized for other purposes.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 8 illustrates a flow diagram of example operations occurring in an LMF according to example embodiments described herein;

FIG. 9 illustrates a flow diagram of example operations occurring in an AN according to example embodiments described herein;

FIG. 10 illustrates a flow diagram of example operations occurring in a UE according to example embodiments described herein;

DETAILED DESCRIPTION OF ILLUSTRATIVE EMBODIMENTS

The making and using of the disclosed embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
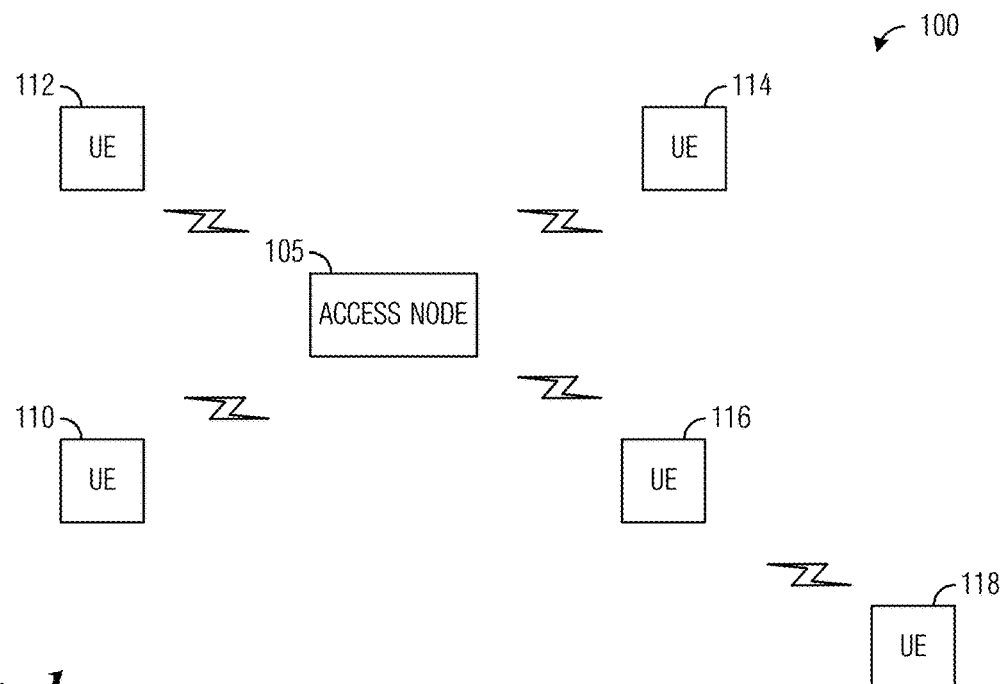
FIG. 1 illustrates an example wireless communications system according to example embodiments described herein.

FIG. 1 illustrates an example wireless communications system 100. Communications system 100 includes an access node 105 serving a plurality of user equipments (UEs), such as UE 110, 112, 114, 116, and 118. In a cellular operating mode, communications to and from the plurality of UEs go through access node 105, while in device to device communications mode, such as proximity services (ProSe) operating mode, for example, direct communication between UEs is possible. As an example, UE no may communicate with services through access node 105, while UEs 116 and 118 may be able to communicate directly with one another without requiring interaction with access node 105.

Access nodes (ANs) may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, and so on, while UEs may also be commonly referred to as mobile stations, mobiles, terminals, users, subscribers, stations, and the like. While it is understood that communications systems may employ multiple ANs capable of communicating with a number of UEs, only one AN, and a number of UEs are illustrated for simplicity.

Observed time difference of arrival (OTDOA) is a technique for determining the location of a device by measuring time differences between specific signals transmitted by other devices. The location of the device may be determined by calculations utilizing the measured time differences. In 3GPP LTE, the positioning reference signals (PRSs) are optimized for increased detectability by UEs, thereby allowing UEs to receive the PRSs even from distant cells.

Figure 2:
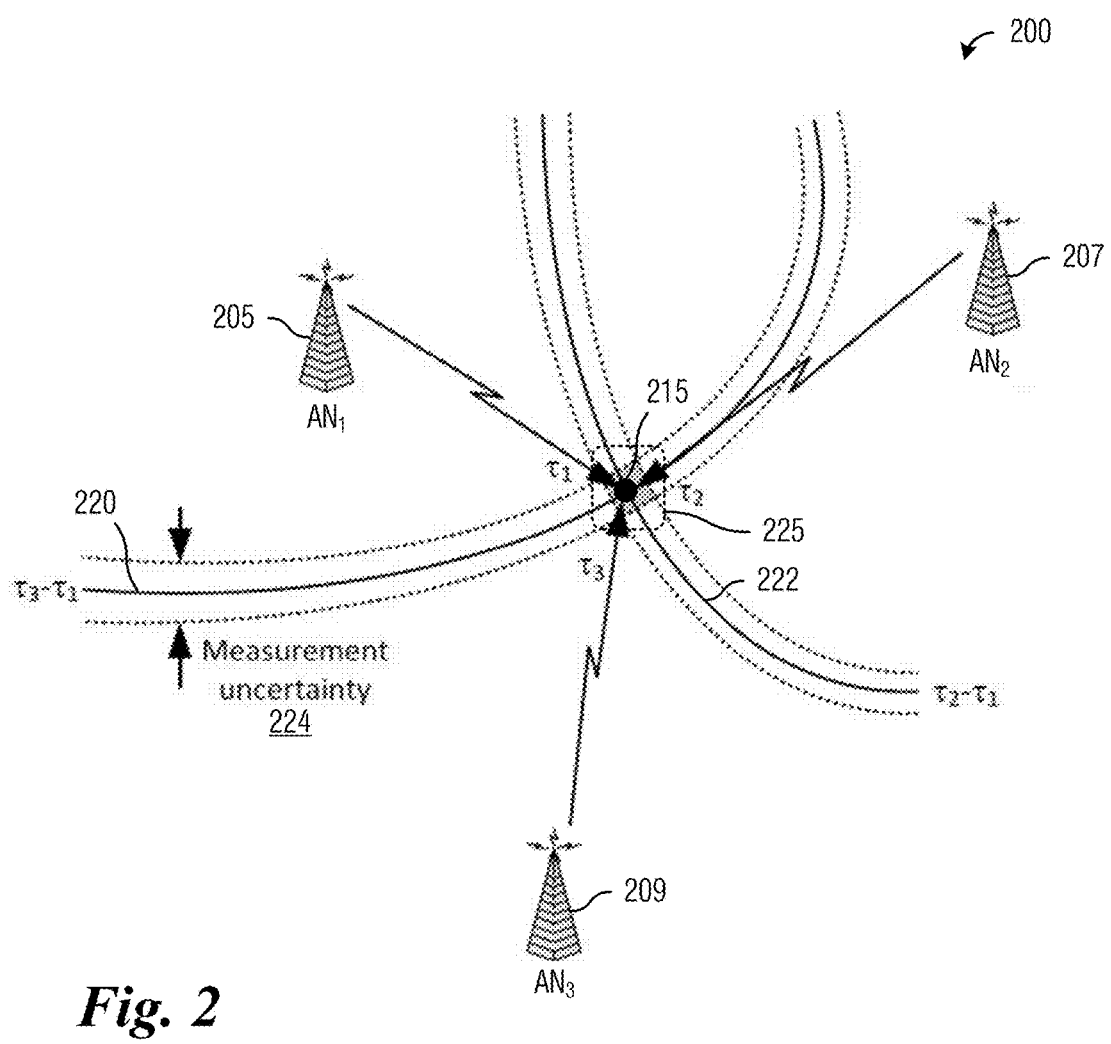
FIG. 2 illustrates an example communications system highlighting the position determination of a communications device using an OTDOA method according to example embodiments described herein.

FIG. 2 illustrates a communications system 200 highlighting the position determination of a communications device using an OTDOA method. Communications system 200 includes ANs, including a first AN (AN1) 205, a second AN (AN2) 207, and a third AN (AN3) 109. Communications system 200 also includes a UE 215, the position of which is to be determined using an OTDOA method. Based on measurements of signals transmitted by the ANs, UE 215 makes OTDOA measurements, including: the time of arrival for AN1 205 $\tau_1$, the time of arrival for AN2 207 $\tau_2$, and the time of arrival for AN3 209 $\tau_3$. The difference in times of arrival between PRSs from different cells is measured by UE 215. The difference in times of arrival between each pair of ANs gives rise to a curve (a hyperbolic curve), with the intersection of the curves providing a position estimate of UE 215. As shown in FIG. 2, a first curve 220 represents potential locations of UE 215 based on a difference $\tau_3$-$\tau_1$, and a second curve 222 represents potential locations of UE 215 based on a difference $\tau_2$-$\tau_1$. A pair of dashed curves around each of first curve 220 and second curve 222 represents measurement uncertainty 224. The measurement uncertainty may be due to factors such as synchronization error, measurement error, quantization error, multipath error, timing offset error, and so on. An intersection 225 of first curve 220 and second curve 222 represents the position of UE 215. It is noted that due to the measurement uncertainty, the exact position of UE 215 may not be known. Hence, intersection 225 is shown as a region rather than an exact point. Hence, the position of UE 215, derived from OTDOA measurements, is an estimate of the position of UE 215.

Figure 3:
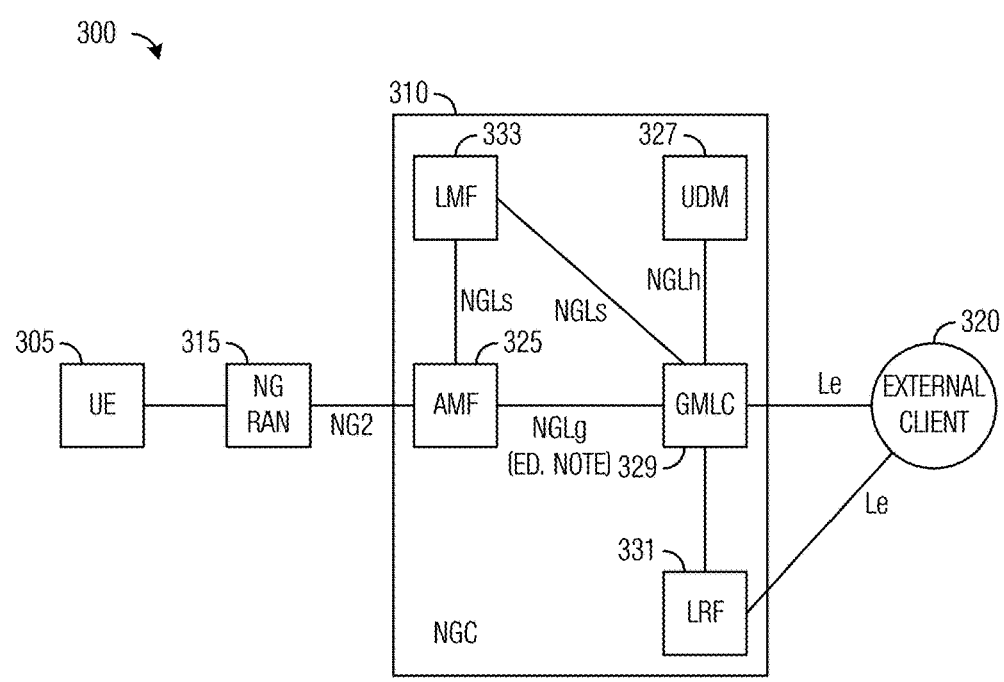
FIG. 3 illustrates an example Fifth Generation (5G) communications system 300 highlighting entities providing position services according to example embodiments described herein.

FIG. 3 illustrates an example Fifth Generation (5G) communications system 300 highlighting entities providing position services. 5G communications system 300 includes a UE 305 connected to a Next Generation (NG) core network (NGC) 310 by a NG radio access network (RAN) 315. An external client 320, connected to NGC 310, may utilize the position of UE 305 to provide services, advertisements, products, applications, and so on.

NGC 310 includes a plurality of entities related to positioning, including an Access and Mobility Management Function (AMF) 325, a Unified Data Management function (UDM) 327, a Gateway Mobile Location Center function (GMLC) 329, a Location Retrieval Function (LRF) 331, and a Location Management Function (LMF) 333. Connecting some of the entities are interconnects, such as NGLs, NGLg, NGLh, and so on. It is noted that whether the NGLs interconnects LMF 333 to AMF 325 or GMLC 329 is a topic for further study.

As discussed previously, in 3GPP LTE, the PRSs are transmitted with periodicity and duration that are configured in the system planning and network management stages of the communications system. However, the PRS transmissions are only useful when at least one UE is being positioned. Therefore, much of the time, the overhead associated with PRS transmission is wasted. It is noted that there is overhead associated with the actual transmission of the PRSs, but there is also overhead due to the PRS subframe being optimized to increase detectability. The PRS subframes are designed to be low-interference. As an example, the PRS subframes include no physical downlink shared channel (PDSCH) to reduce interference from data on the PDSCH onto the PRSs. The amount of overhead is dependent on the configuration of the communications system. In the worst case for 3GPP LTE with wideband PRS with long PRS transmission occasions, the overhead is approximately 3.7%, while the overhead for typical configurations range from 0.3% to 0.6%.

However, when compared to 3GPP LTE, the 5G New Radio (NR) system architecture specifies more aggressive latency standards. Therefore, it may be expected that the timing of PRS transmissions may be more frequent to allow for faster detection, thereby increasing overhead. Additionally, NR UEs may be active in multiple parts of the frequency band of the communications system and not always be monitoring the center frequency of the frequency band, as in 3GPP LTE. These conditions favor the configuration of relatively dense PRS transmissions in order to facilitate the detectability of the PRS by all UEs in a time that meets the latency requirements.

However, configuring dense PRS transmissions negatively impacts downlink performance. When considered with the fact that OTDOA-based positioning may not occur very frequently, the dense PRS transmissions may be largely wasted. The transmission of the PRSs may be limited to occasions when they are actually needed, potentially resulting in a better utilization of communications system resources. Hence, there is a need for systems and methods for the transmission of the PRSs on an on-demand (or as-needed) basis.

According to an example embodiment, positioning signals are configured for transmission by devices on an on-demand (or as-needed) basis. Instead of being configured during system planning to transmit the positioning signals on a periodic basis for a specified duration for each transmission, devices are configured to transmit the positioning signals when an instruction, command, or request is received. In an embodiment, an instruction, command, or request specifies when a device is to transmit the positioning signals. In another embodiment, another instruction, command, or request specifies when a device is to stop transmitting the positioning signals. The positioning signals are transmitted to allow devices to measure characteristics of the positioning signals, e.g., time differences between the positioning signals. PRSs are examples of positioning signals used in the 3GPP LTE series of technical standards. Other technical standards may utilize different positioning signals.

According to an example embodiment, a device transmits positioning signals in accordance with a received instruction, command, or request. As an example, the device receives an instruction, command, or request to commence transmission of positioning signals, and the device transmits the positioning signals in accordance with the instruction, command, or request. The instruction, command, or request may include information regarding where or when to begin the transmission of the positioning signals. As an example, the information specifies a time-frequency resource for the transmission of the positioning signals. As another example, the information specifies a time and a frequency band(s) for the transmission of the positioning signals. As another example, the information specifies a bandwidth to use in the transmission of the positioning signals. As another example, the device is previously configured with where to transmit the positioning signals (e.g., frequency, frequency band, bandwidth, etc.), and the information specifies when the device is to begin transmitting the positioning signals.

Figure 4:
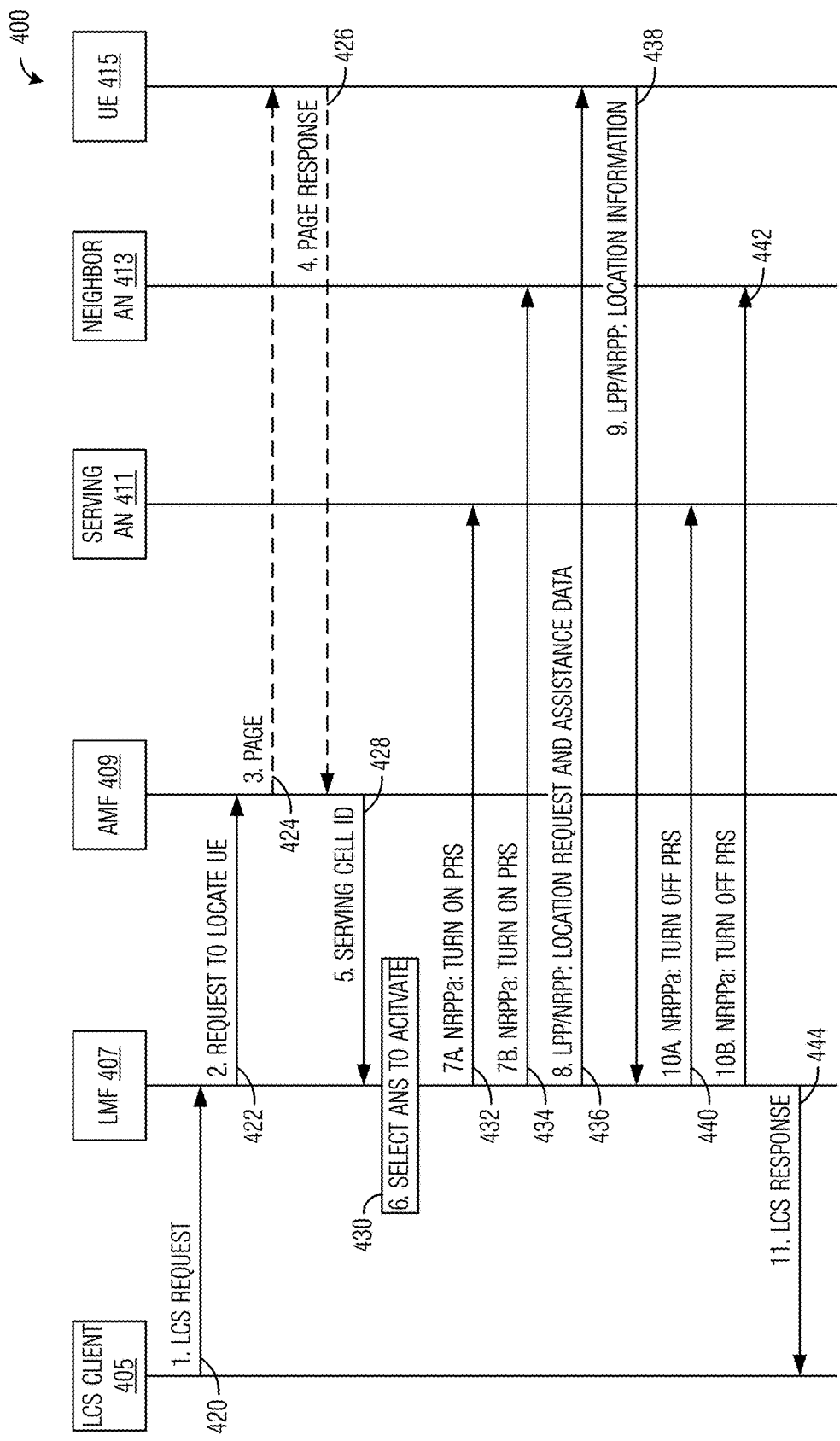
FIG. 4 illustrates a diagram of communications made and processing performed by devices participating in determining the position of a UE utilizing on-demand based positioning signals according to example embodiments described herein.

FIG. 4 illustrates a diagram 400 of communications made and processing performed by devices participating in determining the position of a UE utilizing on-demand based positioning signals. Diagram 400 displays communications made and processing performed by devices, including a location services (LCS) client 405, an LMF 407, an AMF 409, a serving AN 411, a neighbor AN 413, and a UE 415, as the devices participate in determining the position of UE 415 utilizing on-demand based positioning signals.

LCS client 405 sends an LCS request to LMF 407 (event 420). LCS client 405, which may be a mapping, routing, direction, or tracking application on a device, a public safety answering point (PSAP), an information assistant that delivers information, services, or advertisement based on location, and so on, may send the LCS request to determine a position of UE 415. In an embodiment, in order to determine the position of UE 415, a rough estimate of the position of UE 415 may be used to determine which ANs in the communications system will begin transmitting positioning signals. Communications system overhead is reduced by only having the ANs that are in relative close proximity to UE 415 transmit the positioning signals because UE 415 is unlikely to be able to detect positioning signals from distant ANs, thereby having distant ANs transmitting positioning signals is a waste of communications system resources. An example of a rough estimate of the position of UE 415 is a serving cell identifier (serving cell ID) of UE 415.

LMF 407 determines that OTDOA should be used to determine the position of UE 415. LMF 407 sends a request to locate UE 415 to AMF 409 (event 422). The request to locate UE 415 may provide the rough estimate of the position of UE 415 to LMF 407. The request to locate UE 415 may serve as a request for serving cell information of UE 415 from AMF 409. AMF 409 pages UE 415 (event 424). Paging UE 415 is one way to bring UE 415 into a reachable condition, which would allow an exchange of positioning related signaling, e.g., serving cell information, such as serving cell identifier. UE 415 sends a page response to AMF 409 (event 426). AMF 409 sends the serving cell identifier of UE 415 to LMF 407 (event 428).

LMF 407 selects ANs to activate, e.g., begin transmitting positioning signals (block 430). The selection of the ANs may be based upon the serving cell identifier received from AMF 409. As an example, an AN corresponding to the serving cell identifier is selected. It is noted that an exception may be if the serving AN (i.e., the AN corresponding to the serving cell identifier) cannot be a reference AN, e.g., the serving AN is a small cell that does not support transmission of positioning signals. Furthermore, one or more ANs that are in close proximity to the AN corresponding to the serving cell identifier are also selected. These one or more ANs may be referred to as neighboring ANs. ANs may be identified as neighboring ANs based on their physical distance, pathloss, and so on, relative to the AN corresponding to the serving cell identifier. A threshold may be used in the identification of the neighboring ANs. The number of neighboring ANs and the threshold value may be determined based on a desired precision in the position located UE. As an example, if a high precision position is desired, a large number of neighboring ANs may be needed, thereby potentially requiring a relaxation in the threshold (depending upon the AN density of the communications system, for example). While if a low precision position is sufficient, a smaller number of neighboring ANs may be adequate.

In addition to selecting ANs, LMF 407 formulates assistance data to help UE 415 with the positioning process. The assistance data may include information about the ANs in the communications system, identifying information about the ANs, information about the positioning signals transmitted by the ANs, such as bandwidth, location of resource(s) used to convey the positioning signals, positioning signal location within the resource(s), and so on. The information in the assistance data may be for all ANs in the communications system or for the ANs that are within detectable range to UE 415, for example. It is noted that the ANs selected by LMF 407 for transmitting the positioning signals to UE 415 is a subset of the ANs in the assistance data. As an example, the ANs selected by LMF 407 for transmitting positioning signals to UE 415 may be the same as the ANs in the assistance data.

LMF 407 sends to each selected AN an instruction, command, or request to transmit positioning signals, triggering the transmission of the positioning signals (events 432 and 434). The instruction, command, or request may be sent using NR Positioning Protocol a (NRPPa), for example. It is noted that in FIG. 4, LMF 407 sends the instruction, command, or request to transmit positioning signals to two ANs, serving AN 411 and neighbor AN 413. However, in practice, more than two ANs may receive the instruction, command, or request to transmit positioning signals. In general, the more ANs that transmit positioning signals, the more precise the positioning of a UE. It is also noted that it may be possible that one or more of the selected ANs is already transmitting positioning signals to facilitate another UE (or multiple other UEs) make OTDOA measurements. In such a situation, LMF 407 may not send an instruction, command, or request to the one or more of the selected ANs already transmitting positioning signals, or the instruction, command, or request may simply be ignored by ANs already transmitting positioning signals. As discussed previously, serving AN 411 would be expected to transmit positioning signals unless it is incapable of transmitting positioning signals.

LMF 407 sends a message to UE 415 (event 436). The message may convey information about a location request and may include the assistance data, for example. The message may convey information about where or when to find the positioning signals. In other words, the message may convey information about the resources that the AN(s) will be using to transmit the positioning signals. The message may be sent using an LTE Positioning Protocol (LPP) or a NR Positioning Protocol (NRPP), for example. UE 415 makes the OTDOA measurements and sends a message to LMF 407 (event 438). The message may include location information. The location information may include the OTDOA measurements made by UE 415. In such a situation, LMF 407 derives an estimate of the position of UE 415 from the OTDOA measurements. Alternatively, UE 415 may derive its estimated position from the OTDOA measurements and send the estimated position to LMF 407 in the message sent in event 438. The message may be sent using LPP or NRPP, for example. It is noted that the estimated position of UE 415 derived from OTDOA measurements is generally more accurate than the estimated position of UE 415 derived from the serving cell identifier of UE 415.

LMF 407 sends to each selected AN an instruction, command, or request to stop transmitting positioning signals (events 440 and 442). The instruction, command, or request may be sent using NRPPa, for example. It is noted that any one or more of the selected ANs may be sending positioning signals for another UE. As an example, the one or more of the selected ANs may have received instructions, commands, or requests from two or more LMFs to transmit positioning signals, resulting in LMF 407 having no knowledge that the one or more of the selected ANs is transmitting positioning signals because LMF 407 is unaware of the additional instructions, commands, or requests. As another example, the one or more of the selected ANs may have received multiple instructions, commands, or requests from LMF 407 to transmit positioning signals, resulting in LMF 407 having knowledge that the one or more of the selected ANs is transmitting positioning signals. Hence, LMF 407 may not send an instruction, command, or request to the one or more of the selected ANs. For example, for the ANs that LMF 407 knows are not sending positioning signals to support the positioning of other UEs, including at the instruction, command, or request of another LMF, LMF 407 sends an instruction, command, or request to stop transmitting positioning signals. LMF 407 sends an LCS response to LCS client 405 (event 444). The LCS response comprises the estimated position of UE 415, for example.

It is noted that FIG. 4 illustrates a situation wherein the positioning signals configuration is already fixed at each selected AN and is known at LMF 407. Therefore, the selected ANs do not need to be informed about a particular requested positioning signal configuration and LMF 407 does not need to be informed about the particular selected ANs' positioning signal configuration. However, it may be advantageous to allow the positioning signal configurations to be selected dynamically when the transmission is being activated. As an example, the selected ANs may have different positioning signal configurations compatible with their scheduling or bandwidth commitments or availability. However, the LMF has to have information about the different positioning signal configurations.

It is noted that the elementary procedures for positioning signal activation and positioning signal deactivation presented previously may be considered to be class 2 elementary procedures in NRPPa, i.e., the procedures consist of one message (such as a positioning signal activation command) with no response. It is however, possible to introduce a response message to the positioning signal activation procedure. The response message may convey information about activation success or failure. For example, the response message may convey information about positioning signal activation confirm or positioning signal activation failure.

The introduction of a response message to the positioning signal activation procedure would turn the procedure into a class 1 elementary procedure, i.e., the positioning signal activation with response message procedure would become a request or response procedure. In the positioning signal activation with response message procedure, the positioning signal activation message would be a request rather than a command. It is noted that the addition of a response message to the positioning signal deactivation procedure may not be applicable because there should be no failure to turn off positioning signal transmission. However, it is possible to add a response message to the positioning signal deactivation procedure and should not be precluded.

According to an example embodiment, an AN responds to an instruction, command, or request to activate positioning signal transmission with a response message. The response message may include the positioning signal configuration. In other words, the AN sends a response to the instruction, command, or request activating positioning signal transmission. In an illustrative example, an instruction, command, or request including information activating positioning signal transmission is sent to an AN from a LMF, the AN sends back a response message in accordance with its ability to activate positioning signals, e.g., a positioning signal activation response if the AN is able to activate positioning signals or a positioning signal activation failure if the AN is unable to activate positioning signals. The response message may be similar to existing OTDOA information response messages. It is noted that the positioning signal configurations are implementation dependent and may be performed during network management.

According to an example embodiment, an AN does not respond to an instruction, command, or request to deactivate positioning signal transmission. According to an alternative example embodiment, an AN responds to an instruction, command, or request to deactivate positioning signal transmission with a response message.

Figure 5:
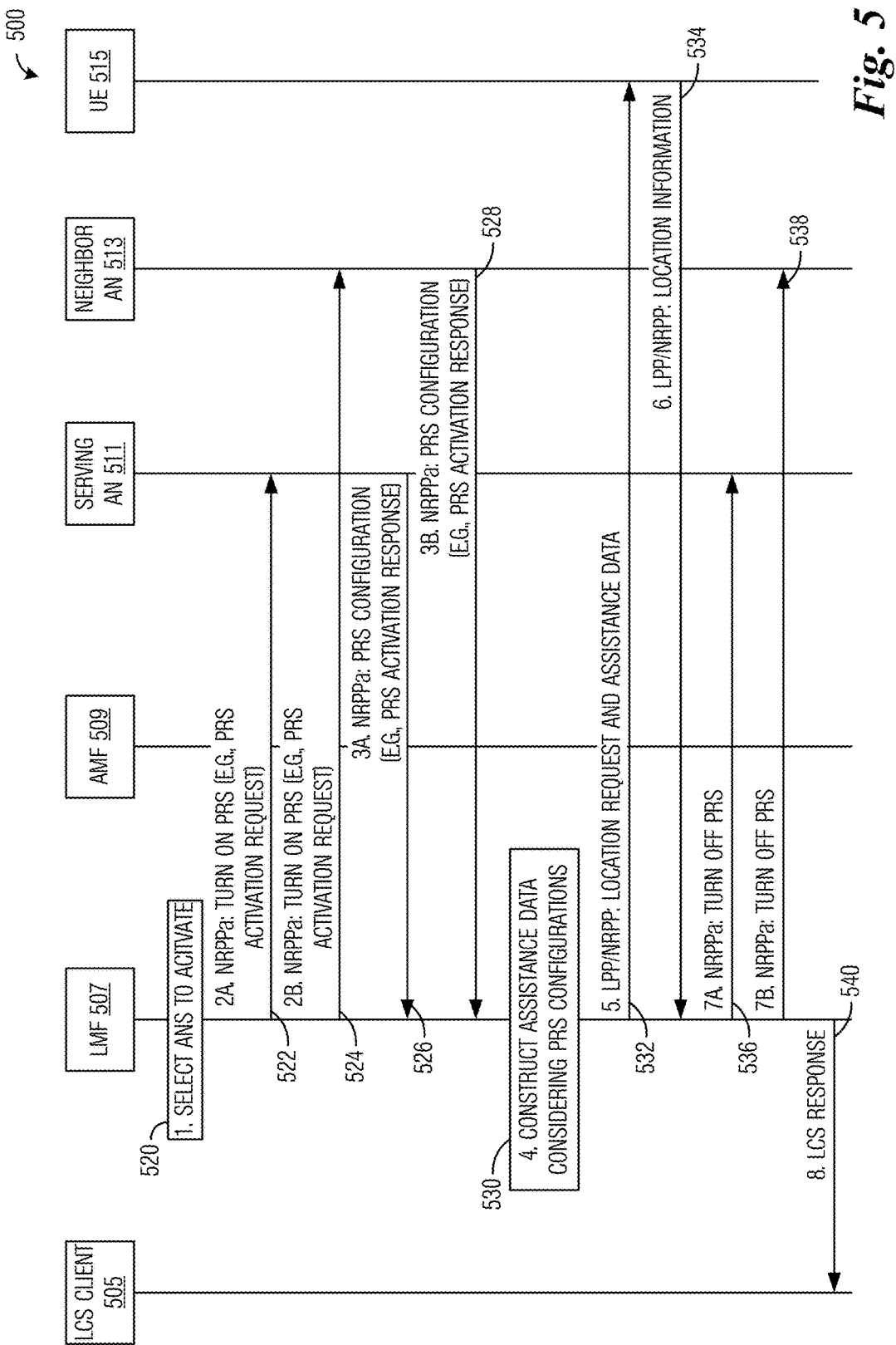
FIG. 5 illustrates a diagram of communications made and processing performed by devices participating in determining the position of a UE utilizing on-demand based positioning signals, wherein ANs respond to positioning signal activation messages according to example embodiments described herein.

FIG. 5 illustrates a diagram 500 of communications made and processing performed by devices participating in determining the position of a UE utilizing on-demand based positioning signals, wherein ANs respond to positioning signal activation messages. Diagram 500 displays communications made and processing performed by devices, including a location services (LCS) client 505, an LMF 507, an AMF 509, a serving AN 511, a neighbor AN 513, and a UE 515, as the devices participate in determining the position of UE 415 utilizing on-demand based positioning signals.

It is noted that the communications made and processing performed by the devices shown in FIG. 5 may occur after LMF 507 has received a rough estimate of the position of UE 515, e.g., LMF 507 has received the serving cell identifier of UE 515. Events 420-428 may be an example of communications made by devices as an LMF receives the rough estimate of the position of a UE.

LMF 507 selects ANs to activate, e.g., begin transmitting positioning signals (block 520). The selection of the ANs may be based upon the serving cell identifier received from AMF 509. LMF 507 sends to each selected AN an instruction, command, or request to transmit positioning signals, triggering the transmission of the positioning signals (events 522 and 524). The instruction, command, or request may be sent using NRPPa, for example. It is noted that in FIG. 5, LMF 507 sends instructions, commands, or requests to transmit positioning signals to two ANs, serving AN 511 and neighbor AN 513. However, in practice, more than two ANs may receive instructions, commands, or requests to transmit positioning signals. The ANs that receive the instruction, command, or request to transmit positioning signals, send back responses (events 526 and 528). The responses may be referred to as positioning signal activation responses, or PRS activation responses. In an embodiment, the responses comprise positioning signal configurations. The responses may be sent using NRPPa, for example.

LMF 507 formulates assistance data to help UE 515 with the positioning process (block 530). The formulation of the assistance data may be in accordance with the positioning signal configurations received from the ANs, e.g., serving AN 511 and neighbor AN 513. For example, the assistance data may comprise a description of the positioning signal configurations received from the ANs, allowing LMF 507 to determine what radio resources should be measured (by UE 515, for example) to detect the positioning signals. LMF 507 may include such information in the assistance data. LMF 507 sends a message to UE 515 (event 532). The message may convey information about a location request and may include the assistance data, for example. The message may convey information about where or when to find the positioning signals. In other words, the message may convey information about the resources that the AN(s) will be using to transmit the positioning signals. The message may be sent using LPP or NRPP, for example. UE 515 makes the OTDOA measurements and sends a message to LMF 507 (event 534). The message may include location information. The location information may include the OTDOA measurements made by UE 515. In such a situation, LMF 507 derives an estimate of the position of UE 515 from the OTDOA measurements. Alternatively, UE 515 may derive its estimated position from the OTDOA measurements and send the position to LMF 507 in the message sent in event 534. The message may be sent using LPP or NRPP, for example. It is noted that the estimated position of UE 515 derived from OTDOA measurements is generally more accurate than the estimated position derived from the serving cell identifier of UE 515.

LMF 507 sends to each selected AN an instruction, command, or request to stop transmitting positioning signals (events 536 and 538). It is noted that it may not be necessary for an AN receiving the instruction, command, or request to stop transmitting positioning signals to send back a response. However, the communications system may be configured in such a way that the AN would send back a response to the instruction, command, or request to stop transmitting positioning signals. The instruction, command, or request may be sent using NRPPa, for example. It is noted that any one or more of the selected ANs may be sending positioning signals for another UE. In such a situation, LMF 507 may not send an instruction, command, or request to the one or more of the selected ANs. However, for the ANs that are not sending positioning signals to support the positioning of other UEs, LMF 507 sends an instruction, command, or request to stop transmitting positioning signals. LMF 507 sends an LCS response to LCS client 505 (event 540). The LCS response comprises the estimated position of UE 515, for example.

Figure 6A:
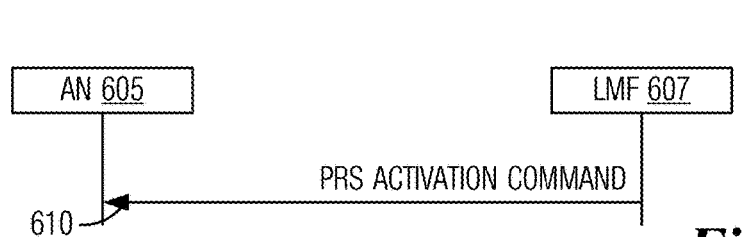
FIG. 6A illustrates a diagram of communications occurring in a class 2 elementary procedure for activating positioning signals according to example embodiments described herein.

FIG. 6A illustrates a diagram 600 of communications occurring in a class 2 elementary procedure for activating positioning signals. As shown in diagram 600, an LMF 607 activates positioning signals at an AN 605 by sending a command conveying positioning signal activation to AN 605 (event 610).

Figure 6B:
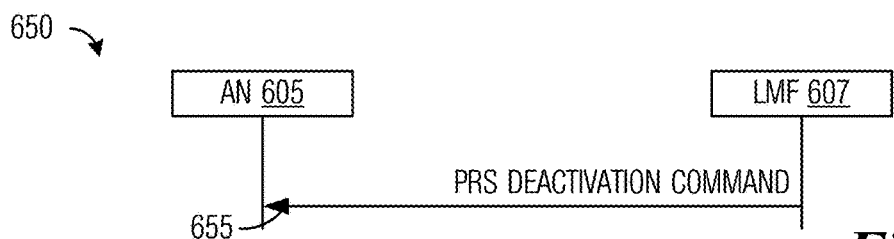
FIG. 6B illustrates a diagram of communications occurring in a class 2 elementary procedure for deactivating positioning signals according to example embodiments described herein.

FIG. 6B illustrates a diagram 650 of communications occurring in a class 2 elementary procedure for deactivating positioning signals. As shown in diagram 650, LMF 607 deactivates positioning signals at AN 605 by sending a command conveying positioning signal deactivation to AN 605 (event 655).

Figure 7A:
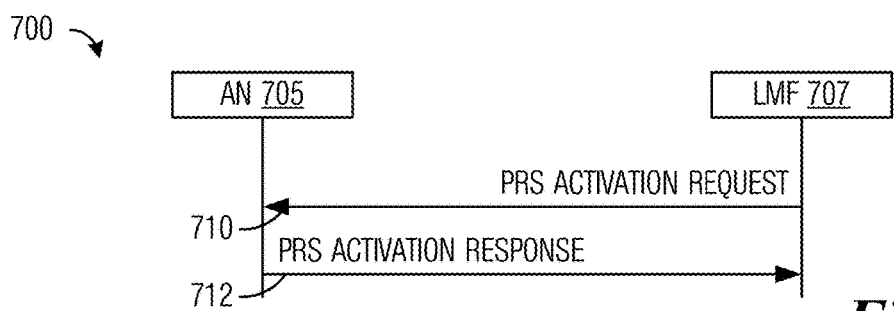
FIG. 7A illustrates a diagram of communication occurring in a class 1 elementary procedure for activating positioning signals, where the activation succeeds according to example embodiments described herein.

FIG. 7A illustrates a diagram 700 of communication occurring in a class 1 elementary procedure for activating positioning signals, where the activation succeeds. As shown in diagram 700, an LMF 707 sends a request conveying positioning signal activation to an AN 705 (event 710). AN 705 successfully activates positioning signals and sends a response conveying successful activation of positioning signals to LMF 707 (event 712).

Figure 7B:
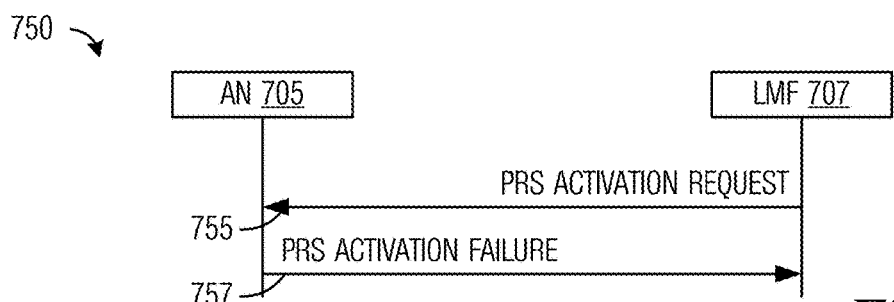
FIG. 7B illustrates a diagram of communication occurring in a class 1 elementary procedure for activating positioning signals, where the activation fails according to example embodiments described herein.

FIG. 7B illustrates a diagram 750 of communication occurring in a class 1 elementary procedure for activating positioning signals, where the activation fails. As shown in diagram 750, LMF 707 sends a request conveying positioning signal activation to AN 705 (event 755). However, AN 705 is unsuccessful in activating positioning signals and sends a response conveying unsuccessful activation (i.e., activation failure) of positioning signals to LMF 707 (event 757).

FIG. 8 illustrates a flow diagram of example operations 800 occurring in an LMF. Operations 800 may be indicative of operations occurring in an LMF as the LMF participates in UE positioning with on-demand positioning signals.

Operations Boo begin with the LMF obtaining a serving cell identifier of a UE (block 805). The UE is the UE for which the position is being determined. The serving cell identifier may serve as a rough estimate of the location of the UE. The LMF selects a set of ANs, the ANs of the set of ANs will be instructed to transmit positioning signals (block 807). The selection of the set of ANs is in accordance with the serving cell identifier. As an illustrative example, the LMF selects the ANs that are in close proximity with an AN associated with the serving cell identifier to be members of the set of ANs. The LMF sends an instruction, command, or request to the ANs to activate their transmission of positioning signals (block 809). If one or more of the ANs of the set of ANs is already transmitting positioning signals to support the positioning of another UE, the LMF may not send the instruction, command, or request to the one or more ANs. The LMF may send an individual instruction, command, or request to each AN in the set of ANs. Alternatively, the LMF may send a single instruction, command, or request addressed to the ANs in the set of ANs. The LMF may receive a response to the instruction, command, or request activating the positioning signals (block 811). The response may include positioning signal configurations used by the ANs. The LMF may receive a response from each of the ANs in the set of ANs.

The LMF sends a location request for position measurements to the UE (block 813). The location request may include assistance data to help the UE with the positioning process. The location request may convey information about where or when to find the positioning signals, for example. In other words, the location request may convey information about the resources that the AN(s) will be using to transmit the positioning signals. The LMF receives position measurement information from the UE (block 815). The position measurement information may include OTDOA measurements made by the UE, and in such a situation, the LMF derives the estimated position of the UE from the OTDOA measurements. Alternatively, position measurement information may include the estimated position of the UE, which was determined by the UE from its own OTDOA measurements. The LMF sends an instruction, command, or request to the ANs of the set of ANs to deactivate positioning signals (block 817). It is noted that in a situation where one or more of the ANs of the set of ANs still needs to transmit positioning signals to facilitate the positioning of other UEs, the LMF does not send an instruction, command, or request to the one or more ANs to deactivate positioning signals.

FIG. 9 illustrates a flow diagram of example operations 900 occurring in an AN. Operations 900 may be indicative of operations occurring in an AN as the AN participates in UE positioning with on-demand positioning signals.

Operations 900 begin with the AN receiving an instruction, command, or request to transmit positioning signals (block 905). The instruction, command, or request may include information about where, when, or how to transmit the positioning signals. The AN may send a response to the instruction, command, or request back to the LMF (block 907). The response may include positioning signal configurations used by the AN. The AN sends the positioning signals (block 909). The positioning signals may be sent in accordance with the where, when, or how specified in the instruction, command, or request. Alternatively, the positioning signals may be sent in accordance with the positioning signal configuration. The AN receives an instruction, command, or request to deactivate positioning signals (block 911). The AN deactivates the positioning signals and stops sending the positioning signals (block 913).

FIG. 10 illustrates a flow diagram of example operations 1000 occurring in a UE. Operations 1000 may be indicative of operations occurring in a UE as the UE participates in UE positioning with on-demand positioning signals.

Operations 1000 begin with the UE receiving a location request for position measurements from an LMF (block 1005). The location request may include assistance data to help the UE with the positioning process. The location request may convey information about where or when to find the positioning signals, for example. In other words, the location request may convey information about the resources that the AN(s) will be using to transmit the positioning signals. The UE measures the positioning signals (block 1007) and makes OTDOA measurements in accordance with the positioning signals. The UE generates positioning measurement information from the OTDOA measurements (block 1009) and sends the positioning measurement information to the LMF (block 1011). In an embodiment, the UE generates the estimated position from the OTDOA measurements and sends the estimated position to the LMF.

Figure 11:
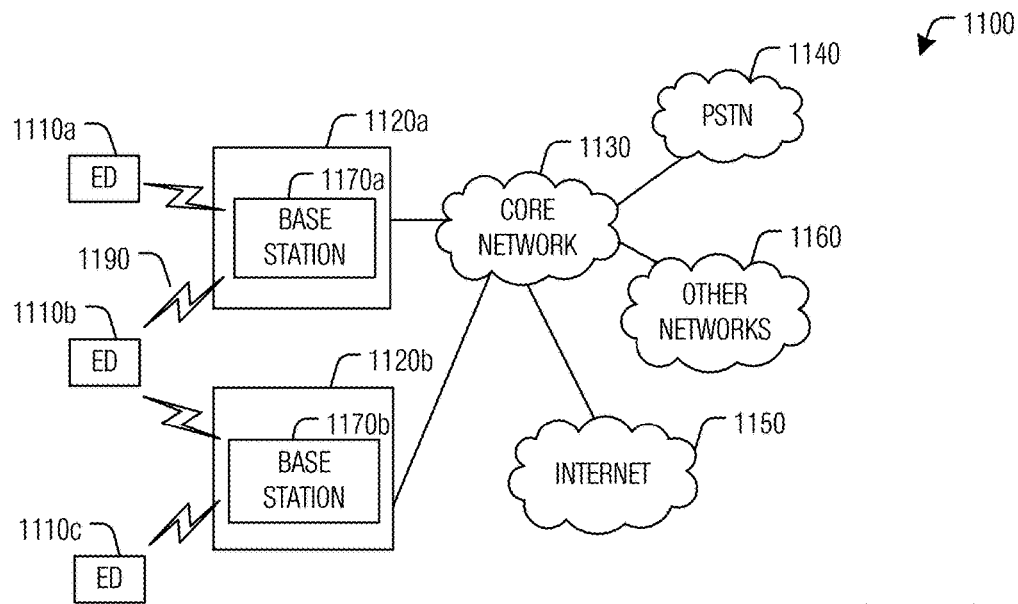
FIG. 11 illustrates an example communication system according to example embodiments described herein.

FIG. 11 illustrates an example communication system 1100. In general, the system 1100 enables multiple wireless or wired users to transmit and receive data and other content. The system 1100 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1100 includes electronic devices (ED) 1110a-1110c, radio access networks (RANs) 1120a-1120b, a core network 1130, a public switched telephone network (PSTN) 1140, the Internet 1150, and other networks 1160. While certain numbers of these components or elements are shown in FIG. 11, any number of these components or elements may be included in the system 1100.

The EDs 1110a-1110c are configured to operate or communicate in the system 1100. For example, the EDs 1110a-1110c are configured to transmit or receive via wireless or wired communication channels. Each ED 1110a-1110c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 1112a-1120b here include base stations 1170a-1170b, respectively. Each base station 1170a-1170b is configured to wirelessly interface with one or more of the EDs 1110a-1110c to enable access to the core network 1130, the PSTN 1140, the Internet 1150, or the other networks 1160. For example, the base stations 1170a-1170b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 1110a-1110c are configured to interface and communicate with the Internet 1150 and may access the core network 1130, the PSTN 1140, or the other networks 1160.

In the embodiment shown in FIG. 11, the base station 1170a forms part of the RAN 1120a, which may include other base stations, elements, or devices. Also, the base station 1170b forms part of the RAN 1120b, which may include other base stations, elements, or devices. Each base station 1170a-1170b operates to transmit or receive wireless signals within a particular geographic region or area, sometimes referred to as a "cell." In some embodiments, multiple-input multiple-output (MIMO) technology may be employed having multiple transceivers for each cell.

The base stations 1170a-1170b communicate with one or more of the EDs 1110a-1110c over one or more air interfaces 1190 using wireless communication links. The air interfaces 1190 may utilize any suitable radio access technology.

It is contemplated that the system 1100 may use multiple channel access functionality, including such schemes as described above. In particular embodiments, the base stations and EDs implement LTE, LTE-A, or LTE-B. Of course, other multiple access schemes and wireless protocols may be utilized.

The RANs 1120a-1120b are in communication with the core network 1130 to provide the EDs 1110a-1110c with voice, data, application, Voice over Internet Protocol (VoIP), or other services. Understandably, the RANs 1120a-1120b or the core network 1130 may be in direct or indirect communication with one or more other RANs (not shown). The core network 1130 may also serve as a gateway access for other networks (such as the PSTN 1140, the Internet 1150, and the other networks 1160). In addition, some or all of the EDs 1110a-1110c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1150.

Although FIG. 11 illustrates one example of a communication system, various changes may be made to FIG. 11. For example, the communication system 1100 could include any number of EDs, base stations, networks, or other components in any suitable configuration.

Figure 12A:
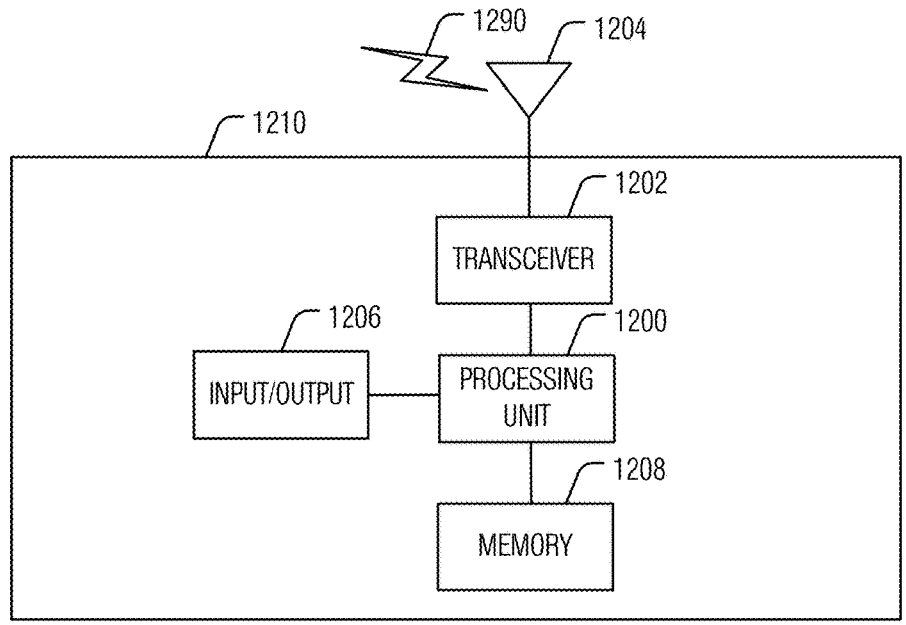
FIGS. 12A and 12B illustrate example devices that may implement the methods and teachings according to this disclosure.
Figure 12B:
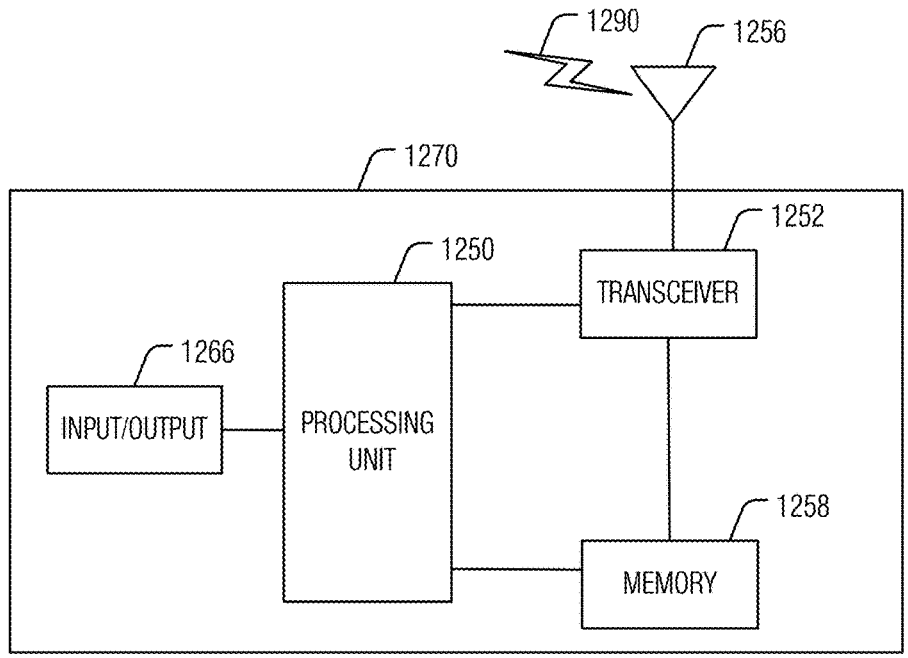

FIGS. 12A and 12B illustrate example devices that may implement the methods and teachings according to this disclosure. In particular, FIG. 12A illustrates an example ED 1210, and FIG. 12B illustrates an example base station 1270. These components could be used in the system 1100 or in any other suitable system.

As shown in FIG. 12A, the ED 1210 includes at least one processing unit 1200. The processing unit 1200 implements various processing operations of the ED 1210. For example, the processing unit 1200 could perform signal coding, data processing, power control, input/output processing, or any other functionality enabling the ED 1210 to operate in the system 1100. The processing unit 1200 also supports the methods and teachings described in more detail above. Each processing unit 1200 includes any suitable processing or computing device configured to perform one or more operations. Each processing unit 1200 could, for example, include a microprocessor, microcontroller, digital signal processor, field programmable gate array, or application specific integrated circuit.

The ED 1210 also includes at least one transceiver 1202. The transceiver 1202 is configured to modulate data or other content for transmission by at least one antenna or NIC (Network Interface Controller) 1204. The transceiver 1202 is also configured to demodulate data or other content received by the at least one antenna 1204. Each transceiver 1202 includes any suitable structure for generating signals for wireless or wired transmission or processing signals received wirelessly or by wire. Each antenna 1204 includes any suitable structure for transmitting or receiving wireless or wired signals. One or multiple transceivers 1202 could be used in the ED 1210, and one or multiple antennas 1204 could be used in the ED 1210. Although shown as a single functional unit, a transceiver 1202 could also be implemented using at least one transmitter and at least one separate receiver.

The ED 1210 further includes one or more input/output devices 1206 or interfaces (such as a wired interface to the Internet 1150). The input/output devices 1206 facilitate interaction with a user or other devices (network communications) in the network. Each input/output device 1206 includes any suitable structure for providing information to or receiving/providing information from a user, such as a speaker, microphone, keypad, keyboard, display, or touch screen, including network interface communications.

In addition, the ED 1210 includes at least one memory 1208. The memory 1208 stores instructions and data used, generated, or collected by the ED 1210. For example, the memory 1208 could store software or firmware instructions executed by the processing unit(s) 1200 and data used to reduce or eliminate interference in incoming signals. Each memory 1208 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 12B, the base station 1270 includes at least one processing unit 1250, at least one transceiver 1252, which includes functionality for a transmitter and a receiver, one or more antennas 1256, at least one memory 1258, and one or more input/output devices or interfaces 1266. A scheduler, which would be understood by one skilled in the art, is coupled to the processing unit 1250. The scheduler could be included within or operated separately from the base station 1270. The processing unit 1250 implements various processing operations of the base station 1270, such as signal coding, data processing, power control, input/output processing, or any other functionality. The processing unit 1250 can also support the methods and teachings described in more detail above. Each processing unit 1250 includes any suitable processing or computing device configured to perform one or more operations. Each processing unit 1250 could, for example, include a microprocessor, microcontroller, digital signal processor, field programmable gate array, or application specific integrated circuit.

Each transceiver 1252 includes any suitable structure for generating signals for wireless or wired transmission to one or more EDs or other devices. Each transceiver 1252 further includes any suitable structure for processing signals received wirelessly or by wire from one or more EDs or other devices. Although shown combined as a transceiver 1252, a transmitter and a receiver could be separate components. Each antenna 1256 includes any suitable structure for transmitting or receiving wireless or wired signals. While a common antenna 1256 is shown here as being coupled to the transceiver 1252, one or more antennas 1256 could be coupled to the transceiver(s) 1252, allowing separate antennas 1256 to be coupled to the transmitter and the receiver if equipped as separate components. Each memory 1258 includes any suitable volatile or non-volatile storage and retrieval device(s). Each input/output device 1266 facilitates interaction with a user or other devices (network communications) in the network. Each input/output device 1266 includes any suitable structure for providing information to or receiving/providing information from a user, including network interface communications.

Figure 13:
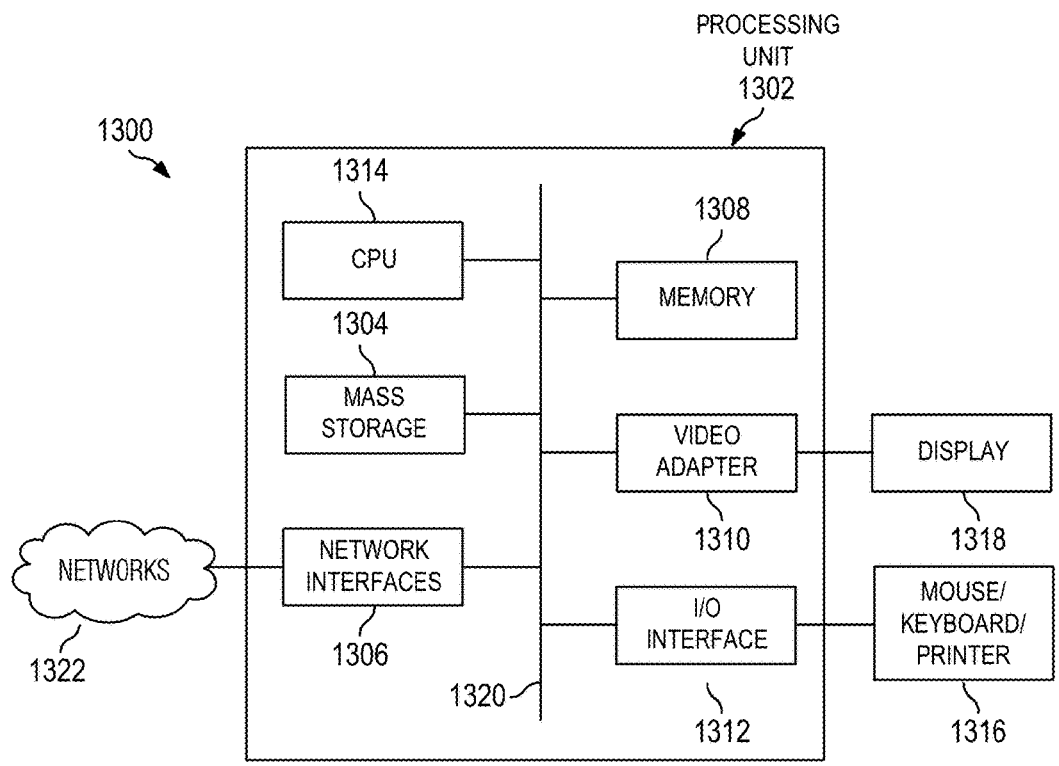
FIG. 13 is a block diagram of a computing system that may be used for implementing the devices and methods disclosed herein.

FIG. 13 is a block diagram of a computing system 1300 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1300 includes a processing unit 1302. The processing unit includes a central processing unit (CPU) 1314, memory 1308, and may further include a mass storage device 1304, a video adapter 1310, and an I/O interface 1312 connected to a bus 1320.

The bus 1320 may be one or more of any type of several bus architectures including a memory bus or memory controller, a peripheral bus, or a video bus. The CPU 1314 may comprise any type of electronic data processor. The memory 1308 may comprise any type of non-transitory system memory such as static random access memory (SRAM), dynamic random access memory (DRAM), synchronous DRAM (SDRAM), read-only memory (ROM), or a combination thereof. In an embodiment, the memory 1308 may include ROM for use at boot-up, and DRAM for program and data storage for use while executing programs.

The mass storage 1304 may comprise any type of non-transitory storage device configured to store data, programs, and other information and to make the data, programs, and other information accessible via the bus 1320. The mass storage 1304 may comprise, for example, one or more of a solid state drive, hard disk drive, a magnetic disk drive, or an optical disk drive.

The video adapter 1310 and the I/O interface 1312 provide interfaces to couple external input and output devices to the processing unit 1302. As illustrated, examples of input and output devices include a display 1318 coupled to the video adapter 1310 and a mouse, keyboard, or printer 1316 coupled to the I/O interface 1312. Other devices may be coupled to the processing unit 1302, and additional or fewer interface cards may be utilized. For example, a serial interface such as Universal Serial Bus (USB) (not shown) may be used to provide an interface for an external device.

The processing unit 1302 also includes one or more network interfaces 1306, which may comprise wired links, such as an Ethernet cable, or wireless links to access nodes or different networks. The network interfaces 1306 allow the processing unit 1302 to communicate with remote units via the networks. For example, the network interfaces 1306 may provide wireless communication via one or more transmitters/transmit antennas and one or more receivers/receive antennas. In an embodiment, the processing unit 1302 is coupled to a local-area network 1322 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a selecting unit/module, a determining unit/module, a generating unit/module, or a stopping unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A computer-implemented method for operating a core network device, the method comprising:
    selecting, by the core network device, a set of access nodes in accordance with a first estimated position of a user equipment (UE);
    sending, by the core network device to the set of access nodes, a first message to activate positioning signal transmission;
    sending, by the core network device to the UE, a request for position measurement information; and
    receiving, by the core network device from the UE, the position measurement information.

2. The method of claim 1, wherein the first estimated position of the UE comprises a serving cell identifier of the UE.

3. The method of claim 2, wherein selecting the set of access nodes comprises selecting, by the core network device, an access node corresponding to the serving cell identifier as a member of the set of access nodes.

4. The method of claim 3, wherein selecting the set of access nodes further comprises selecting, by the core network device, one or more access nodes that are neighbors of the access node corresponding to the serving cell identifier as members of the set of access nodes.

5. The method of claim 1, wherein the position measurement information comprises observed time difference of arrival (OTDOA) measurements.

6. The method of claim 5, further comprising:
    determining, by the core network device, a second estimated position of the UE in accordance with the OTDOA measurements; and sending, by the core network device to a client, the second estimated position of the UE.

7. The method of claim 1, wherein the position measurement information comprises a third estimated position of the UE, and wherein the method comprises sending, by the core network device to a client, the third estimated position of the UE.

8. The method of claim 1, further comprising:
    sending, by the core network device to a subset of the set of access nodes, a second message to deactivate positioning signal transmission.

9. The method of claim 8, wherein the subset of the set of access nodes comprises access nodes not selected for transmitting positioning signals for any other UE.

10. The method of claim 1, further comprising:
    receiving, by the core network device from at least one access node of the set of access nodes, at least one response responsive to the first message to activate positioning signal transmission.

11. The method of claim 10, wherein the at least one response comprises a positioning signal configuration of the at least one access node.

12. The method of claim 11, further comprising:
    generating, by the access node, assistance data in accordance with the positioning signal configuration of the at least one access node; and
    sending, by the core network device to the UE, the assistance data.

13. The method of claim 1, wherein the core network device comprises a Location Management Function (LMF).

14. A computer-implemented method for operating an access node, the method comprising:
    receiving, by the access node from a core network device, a first message to activate positioning signal transmission;
    transmitting, by the access node, a positioning signal in accordance with the first message;
    receiving, by the access node from the core network device, a second message to deactivate positioning signal transmission; and
    stopping, by the access node, the transmission of the positioning signal.

15. The method of claim 14, further comprising:
    sending, by the access node to the core network device, a response responsive to the first message to activate positioning signal transmission.

16. The method of claim 15, wherein the response comprises a positioning signal configuration of the access node.

17. A core network device comprising:
    a non-transitory memory storage comprising instructions; and
    one or more processors in communication with the memory storage, wherein the one or more processors execute the instructions to:
        select, by the core network device, a set of access nodes in accordance with a first estimated position of a user equipment (UE),
        send, by the core network device to the set of access nodes, a first message to activate positioning signal transmission,
        send, by the core network device to the UE, a request for position measurement information, and
        receive, by the core network device from the UE, the position measurement information.

18. The core network device of claim 17, wherein the one or more processors further execute the instructions to select an access node corresponding to a serving cell identifier of the UE as a member of the set of access nodes.

19. The core network device of claim 17, wherein the position measurement information comprises observed time difference of arrival (OTDOA) measurements, and wherein the one or more processors further execute the instructions to determine a second estimated position of the UE in accordance with the OTDOA measurements, and send, to a client, the second estimated position of the UE.

20. The core network device of claim 17, wherein the one or more processors further execute the instructions to send, to a subset of the set of access nodes, a second message to deactivate positioning signal transmission.

21. The core network device of claim 17, wherein the one or more processors further execute the instructions to receive, from at least one access node of the set of access nodes, at least one response responsive to the first message to activate positioning signal transmission.

22. The core network device of claim 21, wherein the at least one response comprises a positioning signal configuration of the at least one access node, and wherein the one or more processors further execute the instructions to generate assistance data in accordance with the positioning signal configuration of the at least one access node, and send, to the UE, the assistance data.

23. An access node comprising:
a non-transitory memory storage comprising instructions; and
one or more processors in communication with the memory storage, wherein the one or more processors execute the instructions to:
receive, from a core network device, a first message to activate positioning signal transmission,
transmit a positioning signal in accordance with the first message,
receive, from the core network device, a second message to deactivate positioning signal transmission, and
stop the transmission of the positioning signal.

24. The access node of claim 23, wherein the one or more processors further execute the instructions to send, to the core network device, a response responsive to the first message to activate positioning signal transmission.

25. The access node of claim 24, wherein the response comprises a positioning signal configuration of the access node.

* * * * *